United States Patent
Graham

[11] 3,727,313
[45] Apr. 17, 1973

[54] DENTAL PROPHYLAXIS RIGHT ANGLE HAND PIECE

[75] Inventor: Raymond C. Graham, Mountain View, Calif.

[73] Assignee: The Denticator Co., Inc., San Francisco, Calif.

[22] Filed: Sept. 22, 1971

[21] Appl. No.: 182,672

[52] U.S. Cl. ................................... 32/27, 32/58
[51] Int. Cl. ..................................... A61c 1/10
[58] Field of Search ....................... 32/27, 58, 57

[56] References Cited

UNITED STATES PATENTS

| | | | |
|---|---|---|---|
| 3,163,934 | 1/1965 | Wiseman | 32/27 |
| 2,300,828 | 11/1942 | Goldenberg | 32/59 |
| 2,315,016 | 3/1943 | Shotton | 32/27 |
| 2,328,270 | 8/1943 | Greenberg | 32/27 |

Primary Examiner—Louis G. Mancene
Assistant Examiner—J. Q. Lever
Attorney—Mark Mohler et al.

[57] ABSTRACT

A disposable dental hand piece having a one-piece elongated tubular shank provided with a right angle hollow head at one end integral therewith, which head is formed with an opening directed at a right angle to the shank for insertion of a gear into the head which gear has a dental tool holder integral therewith, the tool holder projecting outwardly of the opening when the gear is within the head. An elongated spindle extends through the tubular shank from the end opposite the head and has radially projecting axially extending ribs on the outer end portion adjacent to said gear the terminal outer end of the spindle holding the gear and tool holder against withdrawal from the head with the terminal end portions of the ribs providing teeth in mesh with the teeth of the gear for driving the latter. A latch integral with the shank is movable to a nonreturnable position holding the spindle against retraction out of the shank where the teeth on the spindle and on the gear are in driving relation.

10 Claims, 4 Drawing Figures

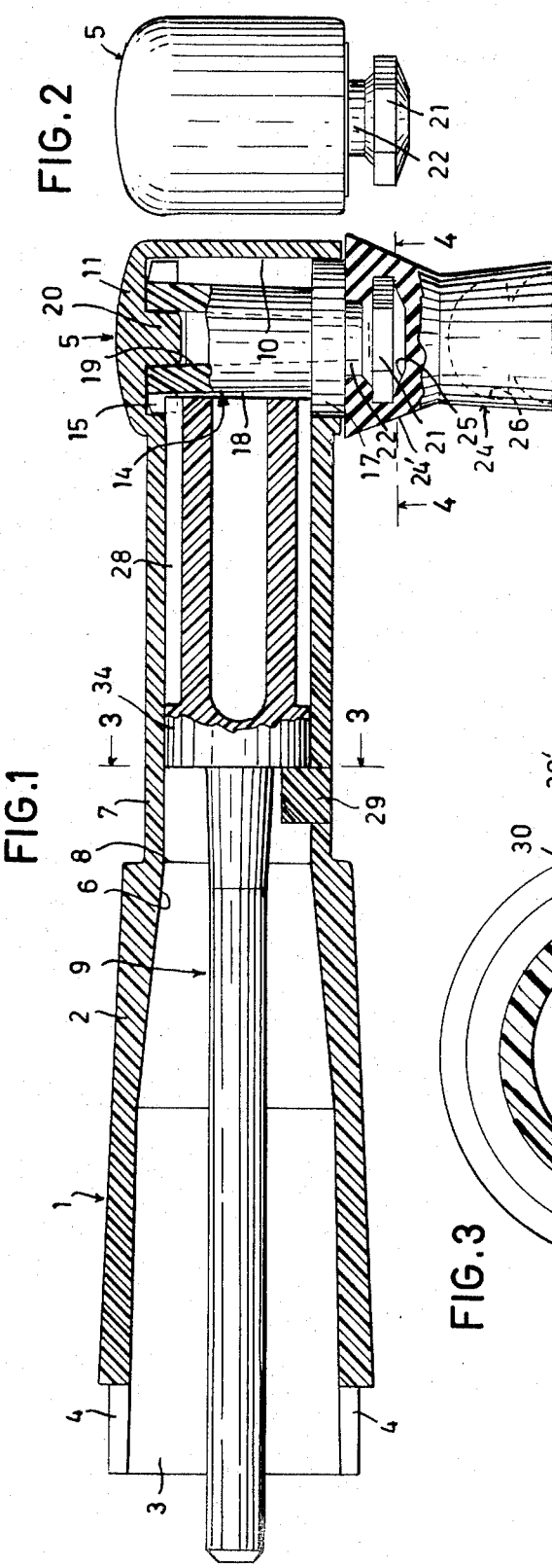
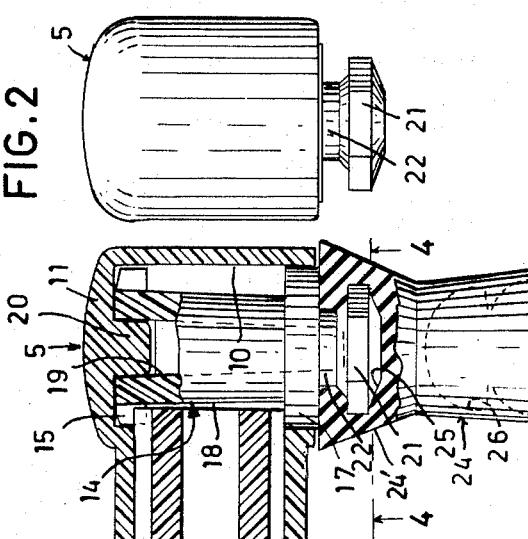
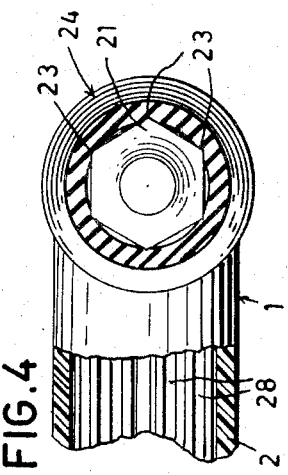
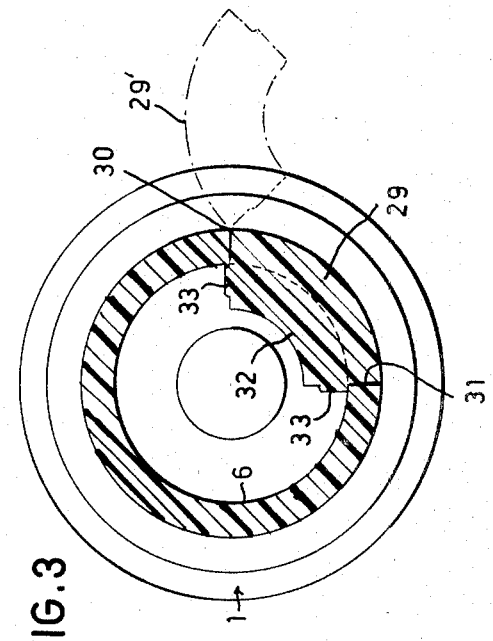

DENTAL PROPHYLAXIS RIGHT ANGLE HAND PIECE

BACKGROUND OF THE INVENTION

This invention is an improvement on a hand piece of the type disclosed in Wiseman United States Letters Patent No. 3,163,934 of Jan. 5, 1965, and also of other right angle hand pieces of the type assembled from many parts, in some of which the main body of the hand piece must be split to enable insertion of the driving and driven elements. In the above designated patent, and others, special caps must be attached to the body of the hand piece to retain the driven elements within the head of said piece. In still others bearings or other elements must be pressed or screwed into the body to support driving and driven elements and to hold separate parts in assembled relation.

The operations of producing and assembling hand pieces of the types above described are expensive and have precluded the production of hand pieces that may be thrown away after use thereby eliminating the further expense of sterilizing the hand piece and also eliminating the attendant risk of incomplete sterilization and transfer of infection.

In conventional hand pieces, there exists the problem of lubrication and the necessity for keeping the abrasive tooth cleaning powder from entering the hand piece and injuring the drive and driven gears and bearings. Such injury heretofore has been a result of repeated uses of the hand piece in operations requiring dental work such as the cleaning and polishing of teeth.

SUMMARY

One of the objects of the present invention is the production of a dental right angle hand piece of generally conventional appearance and manner of use that is made and assembled with sufficient economy to be discarded after use, thus eliminating the necessity for sterilization and the risk of transmission of disease from incomplete sterilization.

Another object of the invention is the production of a dental right angle hand piece consisting of only three separate parts each integrally formed of plastic material.

A still object of the invention is the provision of a dental right angle hand piece in which the driven gear is held in the head of the hand piece by the driving gear that is on the spindle rotatable in the shank, and which spindle is formed with radially projecting vanes that cooperate with the shank to provide a cooling action as well as what may be called an "air-bearing" for the spindle. This spindle may reach a speed up to 25,000 RPM at times, although in use it is usually around 1,000 RPM.

Another object of the invention is the provision of a right angle dental hand piece having a tool holding knob for releasable securement thereon the elastic rubber base of a cleaning and polishing cup or other element, and which knob more securely holds the base on the knob against rotation relative thereto during a dental operation on teeth than the structure shown in the hereinbefore noted Wiseman patent.

Other objects and advantages will appear in the description and drawings.

DESCRIPTION OF DRAWINGS

FIG. 1 is a cross-sectional view through a hand piece, in which a cleaning and polishing cup, or dental tool is releasably held on the hand piece.

FIG. 2 is an end view of the hand piece of FIG. 1 without the cup.

FIG. 3 is an enlarged cross-sectional view taken along line 3—3 of FIG. 1, in which the locking member is shown in full line and in broken line in a position before movement to locking position.

FIG. 4 is a cross-sectional view along line 4—4 of FIG. 1, the tool holding know in bottom plan view.

DETAILED DESCRIPTION

The body of the hand piece is a hollow housing generally designated 1 that comprises an elongated cylindrical tubular shank 2 that is open at one end, which end may be called the inner end. The marginal portion 3 at said open end formed with a pair of parallel slots 4, extending longitudinally of the shank at two opposite sides of the latter. This structure is conventional in the Doriot type hand pieces for connecting the hand piece with a coupling or the like that, in turn, is connected with a source of power.

A hollow head 5 is integral with shank 2 at the outer end of the latter, and the bore 6 of shank 2 opens into one side of said hollow head, while one end of said head adjoining said one side opens outwardly of the head at a right angle to the side opening into the shank 2.

Except for the open inner end of shank 2 and the open end of the housing that opens outwardly of the latter, the housing is closed, and is a unitary body of an acetal plastic commonly known under the trade name of CELCON.

The inner surface of the outer end portion 7 of the bore within shank 2 is cylindrical and of uniform diameter from its opening into head 5 to a point 8 (FIG. 1) approximately midway between the ends of the bore. This cylindrical inner surface is the bearing surface for the inner end portion of an elongated spindle, generally designated 9 that is coaxial with the bore 6 when in operating position within said bore.

The hollow head 5 on the outer end of the shank 2 has a cylindrical inner surface 10 of uniform diameter extending from the end that opens outwardly of the head in a direction at a right angle to the opening into bore 6. An end wall 11 closes the end of the head opposite to its open end.

Within the head 5 is a driven rotatable member generally designated 14. This member is of plastic molded in one piece, and which may be slightly harder than the plastic of housing 1 and is adapted to extend from the inner surface of the end wall 11 to, and projecting outwardly of, the open end of head 5. The inner end of member 14 is the end that is adjacent to the end wall 11 and it is formed with a circumferentially extending row of radially outwardly projecting gear teeth 15. The outer ends of said teeth, when member 14 is in an operative position within head 5, are closely adjacent the inner cylindrical surface 10.

On the outer end of the member 14 is a radially outwardly projecting collar 17, integral therewith. This collar has a flat outer surface engageable with the inner surface 10 of the head at the open end of the latter, and projects slightly outwardly of said open end. The cylindrical outer surface 18 between the teeth 15 and the collar 17 is of lesser diameter than the maximum outside diameter of the row of teeth 15 and the collar 17. When the member 14 is in operating position within the head 5, portions of several teeth 15 will extend across the opening from head 5 into the bore of shank 1 (FIG. 1). The cylindrical inner surfaces 10 of head 5 adjacent to the closed end of the latter provide surfaces of uniform diameter with the surface 10 at the open end of the head being a bearing surface for collar 17.

Said member 14 is formed with a central recess 19 opening axially outwardly at the end wall 11 of the head 5. This recess has a uniform diameter end portion adjacent the end wall 11 providing a bearing surface for a central projection 20 on end wall 11 that projects into the recess 19. The walls of said recess 19 may extend slantingly from approximately it end bearing surface to a point adjacent the terminal outer end of member 14 that is adjacent collar 17.

The axially outwardly facing surfaces of teeth 15 that face the closed end of the head are bevelled, hence the annular axially outwardly facing end surface of member 15 radially inwardly of the teeth is adapted to bear against the inner surface of the closed end 11, while the radially outwardly facing surface of projection 20 and the radially inwardly facing surface of the recess 19 are in bearing engagement. Also the projection 20 functions to center the adjacent end of member 14 within the hollow head while the collar 17 and the radially inwardly facing surface 10 of the head provide bearing surfaces at the open end of the head 5.

Integrally formed on member 14 and projecting outwardly of the head 5 at its open end is a knob or enlargement 21 joined to the main body of the member by a restricted diameter neck 22. This knob 21 is coaxial with the member 14 and has polysided lateral surfaces providing a plurality of equally spaced corners 23 (FIG. 4)

A conventional elastic rubber cup 24 substantially as shown and described in the hereinbefore mentioned patents is formed at its base end 24' with a centrally positioned outwardly opening recess 25 for receiving the knob 21 when the base is stretched over the knob.

The inner surfaces of the recess 25 are substantially complementary in outline to the outer surfaces of knob 21, including neck 22, so that said surfaces will be in snug frictional engagement when the cup is secured on the knob. The knob is polysided, hence the corners 23 on the knob at the junctures between the sides will sink slightly into the inner side surfaces of the recess 25 (FIG. 4) to more strongly resist slippage of the cup on the knob during rotation of the cup in a dental or cleaning operation than were the knob circular in outline.

The axially outwardly opening recess 26 of the cup holds cleaning and polishing powder when in use, and applies the powder to the teeth when the member 14 is rotated and the open end is pressed against the teeth.

The cup 24 is not a part of the hand piece, but is merely representative of one dental tool adapted to be supported on the member 14 of the hand piece when the latter is in use. Other tools having bristles providing a brush instead of a cup, or having a structure other than a cup or brush may be secured on knob 21 in the same manner. Such tools apply abrasive material or produce abrasive material when in use that may enter the head, and injure gears and bearings in conventional, relatively costly, hand pieces, and ultimately require their replacement.

The spindle 9 is formed with radially outwardly projecting teeth 28 that extend longitudinally of the spindle from its terminating outer end to a point adjacent but spaced from the juncture 8 between the outer end portion 7 of the bore 6 and the inner end portion. Said inner end portion of bore 6 is tapered outwardly from said juncture to its inner open end.

The radially outwardly facing surfaces of the teeth 28 are approximately in bearing engagement with uniform inside diameter of portion 7 of bore 6.

In assembling the hand piece, the member 14 is initially inserted into head 5 through the open end of the latter, and the spindle 9 is then inserted into the bore of shank 2 through the inner open end of the latter to a position in which the outer end of the shank is between the annular row of teeth 15 on member 14 and the open end of head 5. In this position the portions of teeth 28 adjacent the terminal outer end of the spindle will be in mesh with the teeth 15, and the outer end of the spindle will hold the member 14 within head 5.

The spindle itself is held within the shank 2 against withdrawal after it has been moved to the position above described, by a latch 29 (FIGS. 1, 3). Latch 29 is part of the sidewall of shank 2, being integrally formed therewith at the same time the shank is formed.

In FIG. 3 the broken line position 29' of latch 29 is the position of the latch when the housing is molded, a hinge piece at 30 connecting the main body of the latch with the shank. This hinge piece is a web of the plastic material of the shank that swingably connects the latch with the shank.

Latch 29 is an arcuately extending segment of the cylindrical shank, and the shank is formed with an opening 31 into which the latch is adapted to swing to close the latter.

The inner or concave side of the latch is formed with a portion 32 that projects into bore 6 of the shank 2 to a position across the axially inwardly facing surface of an annular flange 34 that is integral with the spindle 9 and teeth 28 when said latch is swung from the open position 29' to the full line position shown in FIG. 1. The latch 29 extends substantially a quarter of the way around the spindle and prevents retraction of the spindle from the member 14 once the latch is swung to its closed position and the outer ends of teeth 28 are in mesh with the teeth 15 on member 14. Also portion 32 on latch 29 provides an end bearing surface on latch 29, being engageable with the axially facing surface of flange 34.

The circumferentially facing opposite ends of portion 32 of latch 29 are formed with projections 33 (FIG. 3). The projection 33 at the free end of the latch that is opposite to the flexible hinge piece 30 will snap past the edge of opening 31 when the latch is swung from the open position 29' to the full line position, while the projection 33 adjacent the hinge piece will be moved into bore behind the edge 31 adjacent thereto. When so moved to locking position, after the spindle 9 and member 14 are within the housing, the spindle cannot be withdrawn, and as the outer surface of the latch 29 is flush with the outer surface of the shank 2, the latch cannot be moved out of the opening 31 in the shank.

The external surface of shank 2 may be formed with ribs or any other suitable roughened design to resist slippage in the hand of the operator. Such roughened or friction surface is common, as seen in the hereinbefore mentioned patents, and others in the prior art.

The housing 1, spindle 9 and member 14 provide the three pieces that make up the hand piece. Each piece including all structural features thereon is cast or molded at one time as a unit, and the sole labor of assembly is the insertion of the member 14 and spindle 9, in succession, into the housing, and the swinging of latch 29 to closed position. This enables the hand piece to be made, assembled and supplied to the dentist at a sufficiently low cost to the latter to offset the costs involved in the sterilization and care of costly conventional hand pieces and the depreciation of the latter from wear caused by abrasives, to say nothing of the ever present hazards of possible infection where the same hand piece is used in operations on different patients.

In actual practice the long teeth 28 on the spindle function generally as vanes in a rotary blower to provide an air-bearing along their longitudinally extending edges, and for cooling the bearing surfaces within the housing 1. The plastic material itself is of a character that is self-lubricating. No lubricant is required within the housing 1, and any abrasive material that might enter the head 5 is insufficient to in any way effect the efficiency of the hand piece during its intended operation.

I claim:

1. A dental prophylactic right angle hand piece comprising:
   a. an elongated tubular shank having an inner end and an outer end and a bore extending axially therethrough having inner and outer axially directed open ends respectively at said inner and outer ends of said shank,
   b. a hollow head having side walls at and integral with said outer end of said shank and two opposite ends one being open and directed at a right angle to said shank and an end wall integral with said side walls closing the other end, said outer end of said bore opening into said head through one side of said side walls,
   c. an elongated driven member rotatably supported within said head about an axis perpendicular to the axis of said shank, and a tool-holding element integral with said member projecting from said open end of said head for releasable securement of a dental tool thereon,
   d. an elongated driving spindle rotatably supported within the bore of said shank coaxial therewith having a terminal end portion at the outer end of said bore,
   e. said spindle and said member respectively including driving means integral with said spindle, and driven means integral with said member in releasable driving relation to each other when said spindle is in operative position within said bore and said member is in operative position within said head,
   f. said member being freely fully movable through said open end of said head to said operative position with the driven means thereon adjacent the closed end of said head and said driving spindle being freely fully movable through said inner open end of said bore to operative position with said driving means in driving relation to said driven means after said member is in said operative position,
   g. holding means integral with said spindle at its said terminal outer end in releasable holding engagement with said member for holding said member in its said operative position against removal from the open end of said head, and
   h. locking means on said shank in engagement with said spindle for holding said spindle and the driven means thereon against retraction from said bore and from said operative position.

2. In a hand piece as defined in claim 1;
   i. said driven means comprising an annular row of gear teeth on said member adjacent said end wall of said head and coaxial with the axis of said member, and said driving means comprising an annular row of gear teeth on said spindle coaxial therewith having terminal outer end portions around the outer end of said spindle positioned between the annular row of gears on said member and the open end of said head, said terminal outer end portions being in intermeshing driving relation with the teeth on said member, and
   j. said holding means comprising the terminal outer end portion of said spindle from which the teeth on said spindle radially extend.

3. In a hand piece as defined in claim 1;
   i. a radially outwardly projecting flange on said spindle at the ends of the inner ends of the teeth thereon, and
   j. said locking means comprising a latch element integral with said shank supported for movement into said bore between said flange and the open inner end of said bore after said spindle is in operative position within said bore.

4. In a hand piece as defined in claim 2;
   k. a radially outwardly projecting annular collar integral with said member positioned within the open end of the latter adjacent said tool holding element, and said row of teeth on said member adjacent said end wall of said head projecting radially outwardly of said member for engagement with the outer end portions of the teeth on said spindle,
   l. the inner surface of the side walls of said head around said collar being cylindrical and providing a bearing surface for the collar and means respectively on said end wall and said head coaxial with the axis of rotation of said head supporting said member coaxial within said head.

5. In a hand piece as defined in claim 4;
   m. the inner surface of said end wall on said head providing a thrust bearing for the said head during rotation of said head and during application of axial force on said head in a direction toward said end wall.

6. In a hand piece as defined in claim 1;
   i. said tool holding element comprising a polysided knob providing external corners at the juncture between said sides for frictional engagement with the inner sides of the knob-receiving recess in a elastic walls of a dental polishing tool.

7. A three-piece, disposable, dental, right angle hand piece consisting of;
   a. a molded, plastic, one-piece housing for supporting therein for rotation about axes disposed perpendicular to each other a driving spindle rotatable about one of said axes and a driven dental tool-holding member rotatable about the other of said axes said housing including a latch element movable on rail housing to a locking position for holding said driving spindle within said housing in driving relation to said member; and said housing further including bearing surfaces for rotatably supporting said driving spindle and said driven member for rotation about said axes at a right angle to each other;
   b. a molded, plastic, one-piece driving spindle rotatably supported on one of said bearing surfaces within said housing for rotation about one of said axes, said spindle further including a driving element for releasable connection with a driven element on said member when said spindle and member are in operative positions within said housing for rotating said member by rotation of said spindle,
   c. a molded, plastic, one-piece driven member rotatably supported on another of said bearing surfaces within said housing for rotation about the other of said axes, said member including a driven element connectable with said driving element for driving by the latter, when said spindle and member are in operative positions within said housing,
   d. said one-piece driving spindle including means thereon for engaging and holding said driven member in its operative position within said housing against separation of said driven element from said driving element after said driven member has been inserted into said housing to its operative position followed by insertion of said driving spindle to its operative position whereby said driving spindle will hold the three separate pieces of said hand piece in operative assembled relation with said driving and driven elements in driving relation to each other, said driving spindle and said driven member being freely movable into their operative positions within said housing at a right angle to each other, and out of said housing, prior to movement of said latch element to said locking position.

8. In a hand as defined in claim 7;
   e. said latch element being locked in its locking position against release after said movement thereof to said locking position.

9. In a hand piece as defined in claim 7;
   e. said driving element including external ribs projecting radially outwardly of its axis of rotation providing air-impelling vanes for cooling said spindle and the bearing surfaces therefore.

10. In a hand piece as defined in claim 7;
    f. said driven element consisting of an annular row of gear teeth coaxial with the axis of rotation of said member, and
    g. said means on said spindle for holding said member in its operative position within said housing being a terminal end portion of said spindle engageable with the teeth on said member at the side of said teeth nearest the tool-holder on said member,
    h. said housing including a wall extending over said member at the side thereof opposite to the side engaged by said means on said spindle.

* * * * *